(12) United States Patent
McCarthy et al.

(10) Patent No.: US 11,294,584 B1
(45) Date of Patent: Apr. 5, 2022

(54) METHOD AND APPARATUS FOR AUTOMATICALLY RESOLVING HEADROOM AND SERVICE LEVEL COMPLIANCE DISCREPANCIES

(71) Applicant: EMC IP HOLDING COMPANY LLC, Hopkinton, MA (US)

(72) Inventors: Jason McCarthy, Cambridge, MA (US); Girish Warrier, Natick, MA (US); Rongnong Zhou, South Grafton, MA (US)

(73) Assignee: Dell Products, L.P., Hopkinton, MA (US)

( * ) Notice: Subject to any disclaimer, the term of this patent is extended or adjusted under 35 U.S.C. 154(b) by 69 days.

(21) Appl. No.: 17/060,180

(22) Filed: Oct. 1, 2020

(51) Int. Cl.
*G06F 3/06* (2006.01)

(52) U.S. Cl.
CPC .......... *G06F 3/0631* (2013.01); *G06F 3/0604* (2013.01); *G06F 3/0676* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,811,380 | B1 * | 11/2017 | Martin | G06F 3/0658 |
| 9,983,795 | B1 * | 5/2018 | Naamad | G06F 3/0629 |
| 2018/0089262 | A1 * | 3/2018 | Bhattacharjee | G06F 16/24535 |

OTHER PUBLICATIONS

G. Lipetz, E. Hazan, A. Natanzon and E. Bachmat, "Automated Tiering in a QoS Environment Using Coarse Data," 2013 IEEE 10th International Conference on High Performance Computing and Communications & 2013 IEEE International Conference on Embedded and Ubiquitous Computing, 2013, pp. 1022-1030. (Year: 2013).*

* cited by examiner

*Primary Examiner* — Khoa D Doan
(74) *Attorney, Agent, or Firm* — Anderson Gorecki LLP

(57) ABSTRACT

A workload planner is used to determine headroom and SLE (Service Level Expectation) compliance of a storage system. The historical workload of the storage system over a set of monitoring intervals is obtained, and optionally a new workload to be moved to the storage system is added to the historical workload. Headroom compliance for components of the storage system, and service level expectation compliance on a per-storage group basis are determined by the workload planner. If a headroom or service level expectation violation is determined for one or more of the monitoring intervals, a set of rules are applied to selectively remove monitoring intervals from the time series. The redacted time series is then used to determine headroom and service level expectation compliance. If no violations are found, based on the redacted time series, the storage system meets headroom and SLE requirements.

18 Claims, 13 Drawing Sheets

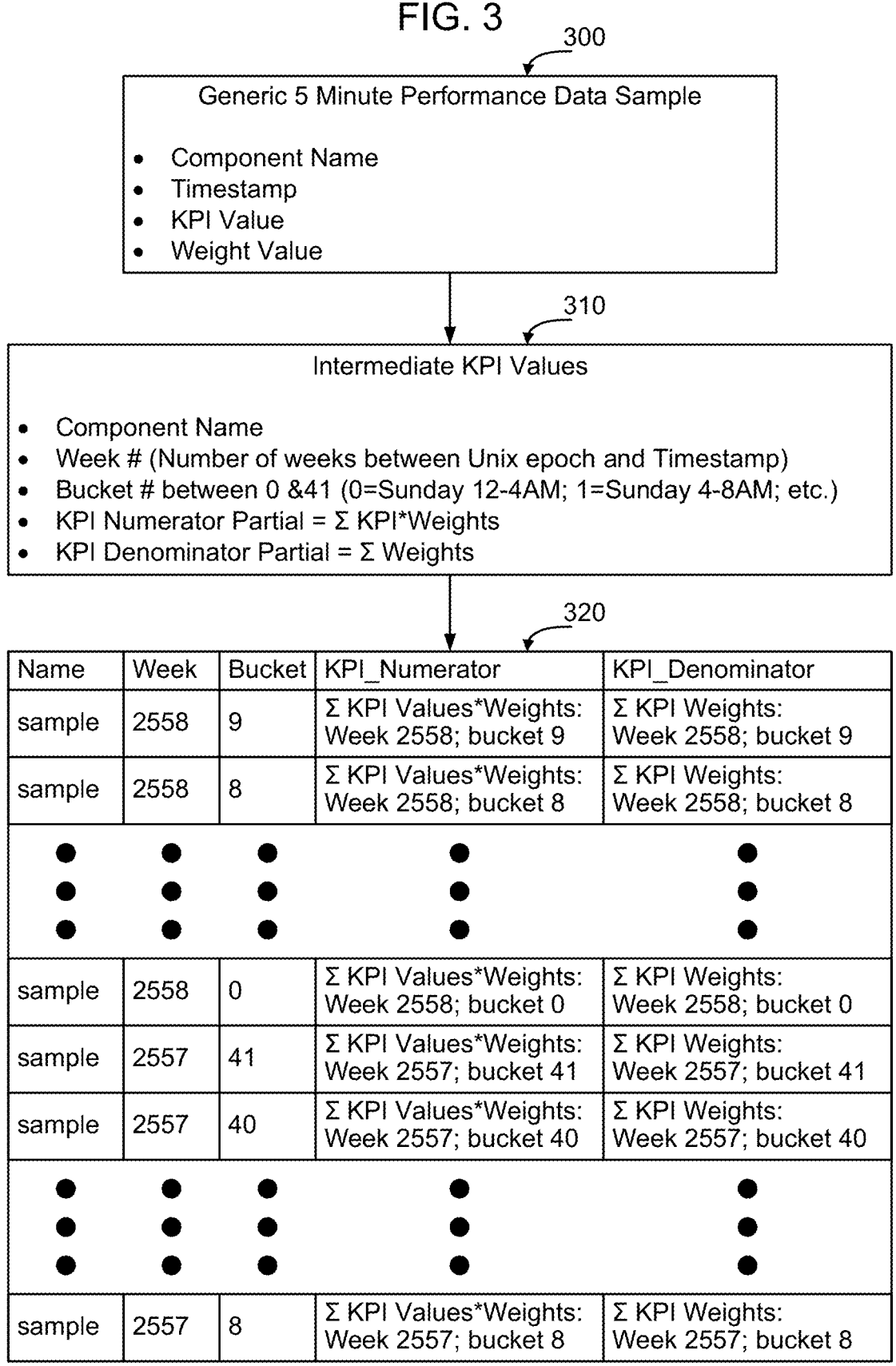

FIG. 4

| Bucket | Two week average Values |
|---|---|
| 0 | (Σ KPI Values*Weights for Weeks n & n-1; bucket 0 data) / (Σ Weights for Weeks n & n-1; bucket 0 data) |
| 1 | (Σ KPI Values*Weights for Weeks n & n-1; bucket 1 data) / (Σ Weights for Weeks n & n-1; bucket 1 data) |
| 2 | (Σ KPI Values*Weights for Weeks n & n-1; bucket 2 data) / (Σ Weights for Weeks n & n-1; bucket 2 data) |
| ... | ... |
| 40 | (Σ KPI Values*Weights for Weeks n & n-1; bucket 40 data) / (Σ Weights for Weeks n & n-1; bucket 40 data) |
| 41 | (Σ KPI Values*Weights for Weeks n & n-1; bucket 41 data) / (Σ Weights for Weeks n & n-1; bucket 41 data) |

| Port Speed (mbps) | 0 | 1 | 2 | 3 | 4 | 5 | ... | 38 | 39 | 40 | 41 | 42 |
|---|---|---|---|---|---|---|---|---|---|---|---|---|
| Max Load (mbps) | 800 | 800 | 800 | 800 | 800 | 800 | ... | 800 | 800 | 800 | 800 | 800 |
| Best Practice Limit (mbps) | 400 | 400 | 400 | 400 | 400 | 400 | ... | 400 | 400 | 400 | 400 | 400 |
| Current Load + Incoming Load (mbps) | 255 | 280 | 270 | 245 | 260 | 215 | ... | 275 | 240 | 250 | 260 | 260 |
| Current Load (mbps) | 235 | 260 | 240 | 233 | 255 | 210 | ... | 266 | 237 | 244 | 233 | 250 |

METHOD AND APPARATUS FOR AUTOMATICALLY RESOLVING HEADROOM AND SERVICE LEVEL COMPLIANCE DISCREPANCIES

FIELD

This disclosure relates to computing systems and related devices and methods, and, more particularly, to a method and apparatus for automatically resolving headroom and service level compliance discrepancies.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A workload planner is used to determine headroom and SLE compliance of a storage system, for example when a new workload is to be added to the storage system. The historical workload of the storage system over a set of monitoring intervals is obtained, and optionally the new workload is added to the historical workload. Headroom compliance for components of the storage system, and service level expectation compliance on a per-storage group basis is then determined, based on the historical workload or the combined workload, by the workload planner. If a headroom or service level expectation violation is determined for one or more of the monitoring intervals, a set of rules are applied to create a redacted time series by selectively removing buckets of key performance indicator data from the time series. The redacted time series is then used to determine headroom and service level expectation compliance. If no violations are found, based on the redacted time series, the storage system meets headroom and SLE requirements, and the new workload can be added to the storage system.

BRIEF DESCRIPTION OF THE DRAWINGS

FIGS. 3 and 4 are functional block diagrams of an example set of data structures for use by a workload planner, according to some embodiments.

FIG. 5 is a functional block diagram of an example data structure showing fluctuation of an example key performance indicator over a two-week period of time, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
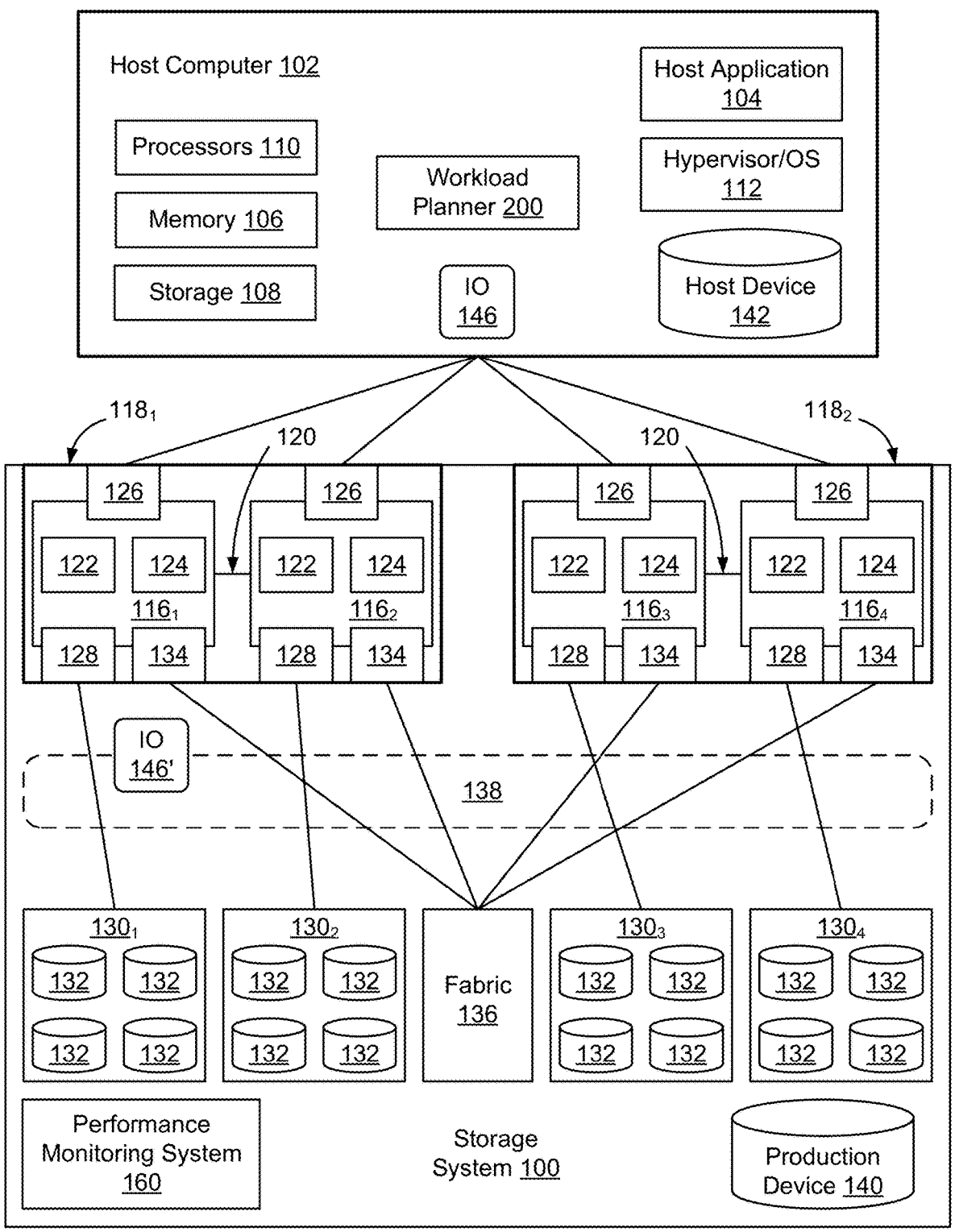
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (operating system) 112. The processors 110 may include one or more multi-core processors that include multiple CPUs, GPUs, and combinations thereof. The host volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented in a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back end adapters 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application 104 data in the virtual shared global memory 138 and the managed drives 132. In response to an IO (input/output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 via one of the compute nodes 116₁-116₄. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes 116₁-116₄ and paths, although the storage system 100 can be configured to limit use of certain paths to certain production devices 140 (zoning).

A data center may have numerous storage systems. Hosts are assigned to execute on one or more of the storage systems and generate workload on the storage systems. When a new host is added to the data center, or if the workload associated with one of the hosts is required to be moved within the data center, it is necessary to determine whether the selected storage system has the ability to handle the host's workload. Specifically, it is desirable to learn, in advance, whether a particular storage system is able to accommodate the increased workload, given the current workload on that storage system.

One way to determine whether a given storage system can accommodate the increase in workload is to use a workload planner application that is configured to calculate service level compliance and headroom values for a given storage system, based on its current (historical) workload and optionally based on a combined workload including the current (historical) workload and the proposed increased workload. As used herein, the term "headroom" is used to refer to the amount of storage capacity, in TeraBytes (TB) of a typical workload that can be added to a given storage system/storage resource pool/emulation combination, without exceeding physical capacity and array component performance capacity limits. The term "SLE (Service Level Expectation) compliance" is used to refer to a measure of a storage group's adherence to a response time expectation associated with an assigned service level. Service level expectation compliance is thus calculated on a per storage group level, whereas headroom compliance is calculated based on usage of various components of the storage system on a storage system basis.

In some embodiments, to calculate SLE compliance and headroom compliance, the workload planner uses two weeks of performance data, broken into four-hour time windows. The workload planner maintains its own database of key performance indicator metrics. The key performance indicator metrics are then used to determine both SLE compliance and headroom compliance.

Workload on a storage system will generally vary over time, which can affect the workload planner's calculation of both SLE compliance and headroom compliance. In the case of storage group SLE compliance, a peak in response time data will cause the storage group SLE compliance state to go from STABLE to MARGINAL in the short term, and to CRITICAL in the longer term. In the case of system headroom, a peak in an underlying back end port, director, or thin pool utilization value, for example, would cause the headroom value to drop to 0.0 TB, which is an indication that the system cannot accept new workload. Thus, workload anomalies can cause the workload planner to determine that a given storage system is not able to handle additional workload, even when the storage system normally has plenty of additional resources.

Figure 6:
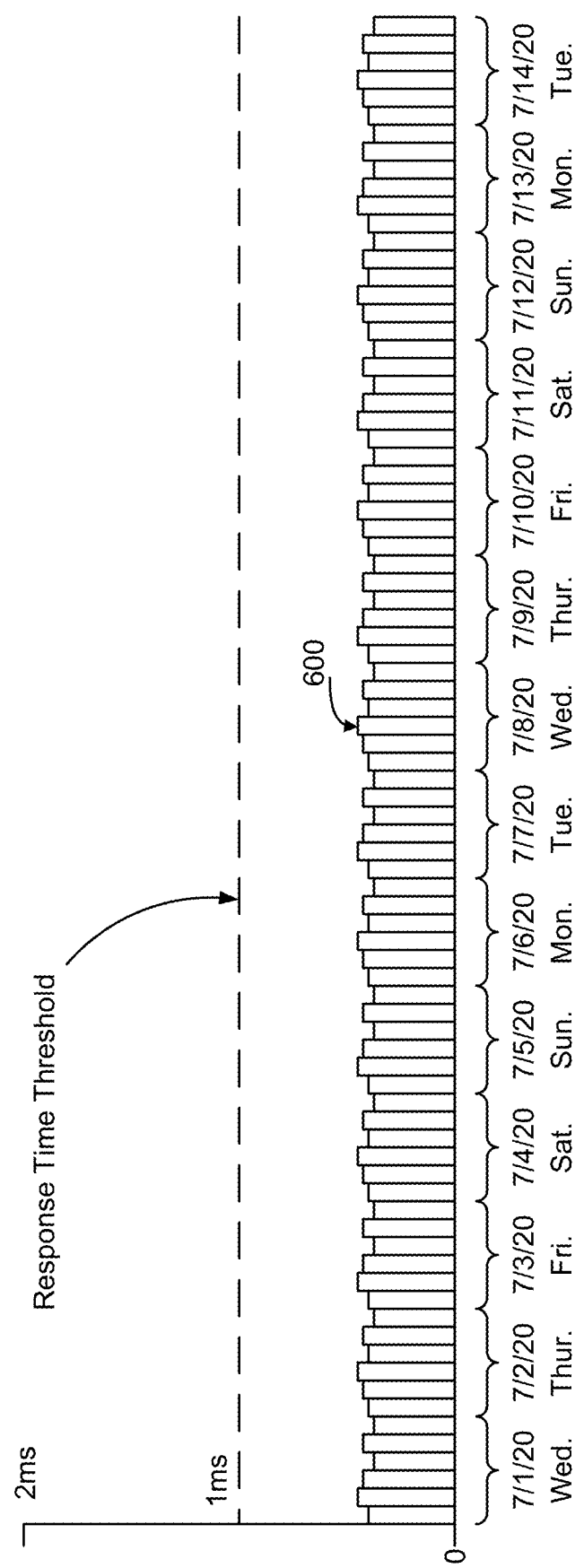
FIG. 6 is a graph showing an example fluctuation of an example key performance indicator (response time) over a two-week period of time, with no instances where the storage system performance exceeded respective threshold.

For example, FIG. 6 is a graph showing an example two weeks of usage data of a key performance indicator (response time). An example response time threshold is shown in FIG. 6 as 1 ms for purposes of illustration. Other threshold values and best practice limits may be set for particular key performance indicators, storage group service level expectations, etc. As shown in FIG. 6, in some embodiments each day is broken into six 4-hour buckets 600. The workload planner receives information from a performance monitoring system 160, for example every 5 minutes, and aggregates the data to determine the storage system average performance over the 4-hour interval. In some embodiments two weeks of data is accumulated and used by the workload planner to calculate storage group SLE compliance and headroom compliance, although other amounts of data may be used as well. FIG. 6 shows a healthy storage system performance in which there are no workload spikes, such that the values determined for the key performance indicator (response time) are always below the respective response time threshold.

Figure 7:
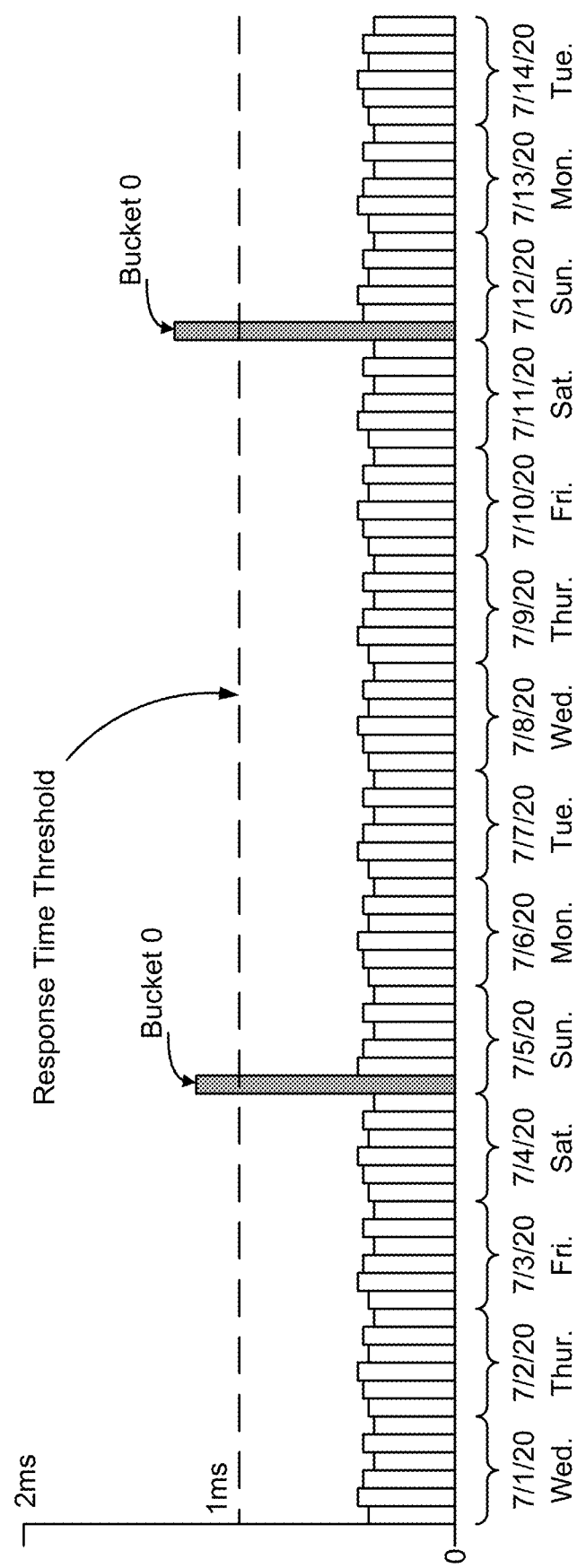
FIG. 7 is a graph showing an example fluctuation of an example key performance indicator (response time) over a two-week period of time, where the storage system performance exceeded a respective threshold for one monitoring interval at the same time each week.

FIG. 7 is a graph similar to the graph of FIG. 6, however there are two spikes in workload which caused the response time of the measured KPI (Key Performance Indicator) to exceed the respective response time threshold. As is clear from FIG. 7, in general the storage system is able to meet its response time target. However, the spikes (gray bars) can cause the workload planner to determine that the storage system is not able to meet the storage group SLE and/or that the storage system had 0.0 TB of available headroom, even though in reality there is plenty of physical capacity remaining.

To get around this, in some workload planners, the user can analyze the system and storage group performance and reset the data collection window to exclude the peaky data. Unfortunately, this is a manual process which requires user intervention and analysis, even in instances where the workload planner has features that provide helpful rollups and views of the underlying data to enable the user to undertake this analysis. Since calculations are based on two weeks of historical data, the peaks will eventually age out, even without user intervention. However, during that interval, the workload planner will provide erroneous results absent user intervention.

To further complicate matters, some customers have certain performance expectations during normal business hours, but max out the storage system during "off" hours, such as at night or on weekends, when backups might be scheduled to occur. Reporting based on these expected peaks in workload is distracting and misleading for these customers, so some embodiments of workload planners allow for individual buckets 600 to be excluded from the storage group SLE and headroom calculations. Once again, this is a manual process, however, which requires user intervention and analysis to implement these recurring data exclusions.

Figure 2:
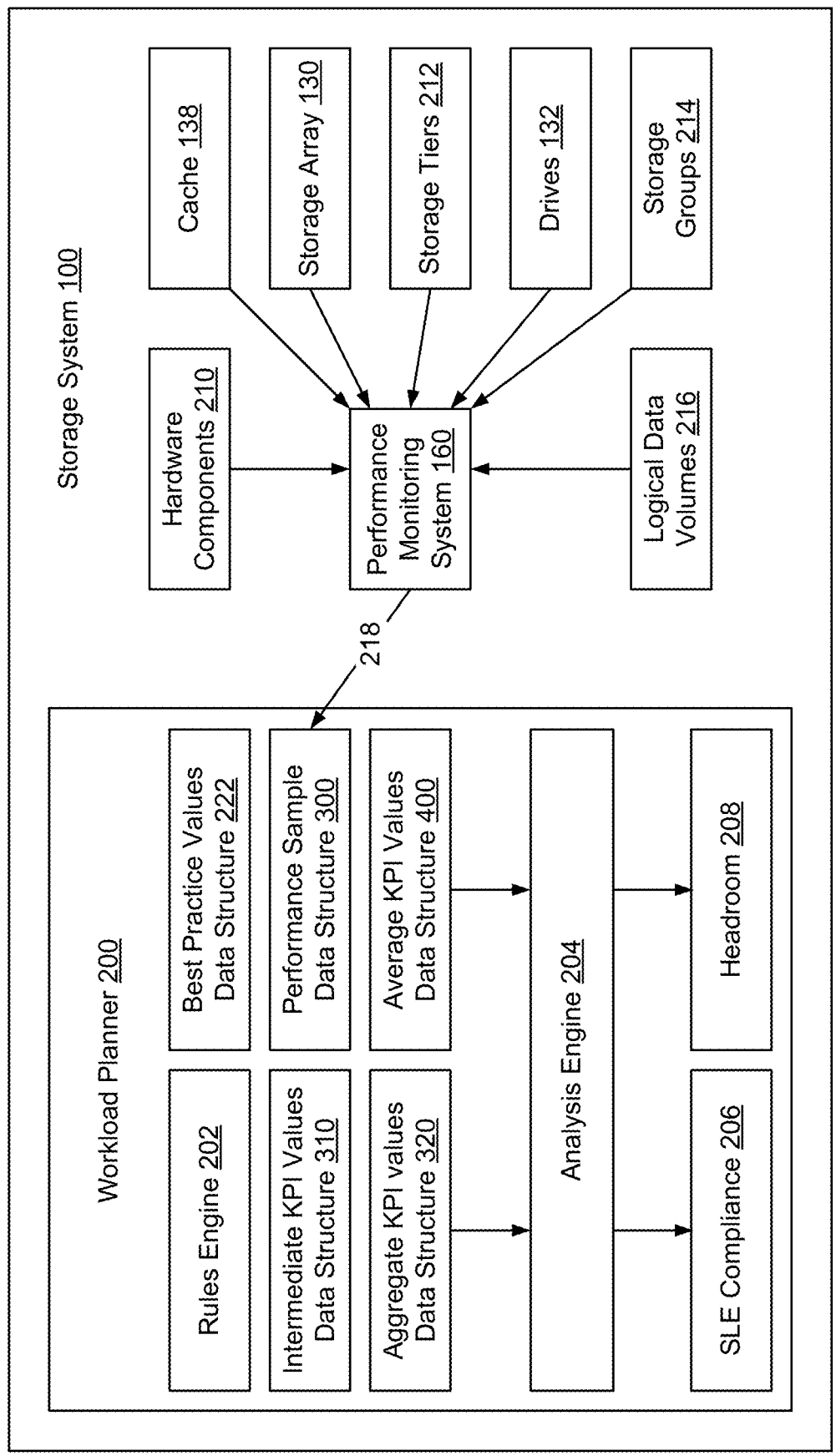
FIG. 2 is a functional block diagram of an example storage system with a performance monitoring system and a workload planner, according to some embodiments.

FIG. 2 is a functional block diagram of an example storage system with a performance monitoring system and a workload planner, according to some embodiments. As shown in FIG. 2, in some embodiments the performance monitoring system 160 collects information related to usage of various hardware components 210 of the storage system 100. Example hardware components were discussed above in connection with FIG. 1, and include for example front end adapters 126, back end adapters 128, processors 122, fabric 136, and other physical components.

In some embodiments, the performance monitoring system 160 also collects information related to usage of storage resources of the storage system, including cache 138, storage arrays 130, storage tiers 212 (in a tiered storage system), and individual drives 132. The performance monitoring system, in some embodiments, also collects information related to logical aspects of the storage resources, including usage information and response time relating to storage groups 214 and other logical data volumes 216.

The performance monitoring system 160 consolidates the storage system operational metrics and periodically provides performance reports (e.g. every 5 minutes) to the workload planner 200 (FIG. 2, arrow 218). The workload planner 200 uses a set of data structures, 300, 310, 320, 400, which are discussed in greater detail in connection with FIGS. 3 and 4, to aggregate the key performance indicators over time to generate a time series of historical storage system performance information, for each key performance indicator. In some embodiments, the key performance indicators are aggregated for monitoring intervals, in which a key performance indicator bucket is created for each monitoring interval. As used herein, the term "bucket" is used to refer to aggregated storage system performance information for a monitoring interval. An example monitoring interval may be, for example four hours. Other length monitoring intervals may be used as well. Where each monitoring interval is four hours long, each bucket represents operation of the storage system during a four-hour time window. The historic time series of KPI performance data are stored in buckets of KPI performance data in the aggregated KPI values data structure 320.

As shown in FIG. 2, in some embodiments the workload planner 200 includes a rules engine 202, an analysis engine 204, and a best practice values data structure 222. The best practices data structure 222 contains information related to thresholds, such as response time thresholds, and best practices limits for each respective key performance indicator.

The analysis engine 204 is configured to use the time series historical storage system operational data from the Aggregate KPI values data structure 320, the average KPI values data structure 400, and the best practice values data structure 222, to calculate storage group SLE (Service Level Expectation) compliance 206 and storage array headroom compliance 208. The rules engine 202 provides exclusion rules to the analysis engine 204 to enable the workload planner 204 to automatically exclude particular buckets 600 of data, in connection with determining headroom and SLE storage group compliance, to enable the workload planner 200 to automatically resolve headroom and SLE compliance discrepancies.

FIG. 3 is a functional block diagram of several example key performance indicator data structures that are used to aggregate KPI data, according to some embodiments. As discussed in greater detail, in some embodiments each monitoring interval is four hours long. Other monitoring intervals may be used depending on the implementation. If the monitoring interval is selected to be four hours in length, a set of 42 buckets is sufficient to describe the performance of the storage system over the course of a given week. Where buckets of other time lengths are used, a different number of buckets 600 would be used to characterize the performance of the storage system over the course of a week. In some embodiments, bucket 0 is assigned to the window of time starting at midnight on Sunday, and ending at 4 AM Sunday morning. Bucket #1 is assigned to the window of time starting at 4 AM Sunday morning, and ending at 8 AM Sunday morning. The buckets are consecutively numbered in this manner throughout the week. Other implementations may assign the buckets differently.

As shown in FIG. 3, in some embodiments the performance monitoring system 160 periodically provides data samples (FIG. 2, arrow 218) throughout the monitoring interval. The performance monitoring system 160 monitors storage system performance for each of the monitored key performance indicators for a given sampling interval, e.g. five minutes, and then reports (arrow 218) the key performance indicators to the workload planner 200. An example sampling interval is five minutes, although other sampling intervals could be used. In some embodiments, the information contained in the data sample (arrow 218) is stored in a performance sample data structure 300. Example performance data includes the component name, a timestamp, the KPI (Key Performance Indicator) value, and a weight value.

The key performance indicator subsystem 202 uses the data from the performance sample data structure 300 to update the content of an intermediate KPI values data structure 310. In some embodiments, the intermediate KPI values data structure 310 includes the component name and the week number, which in the illustrated example is the number of weeks between the Unix epoch (Jan. 1, 1970) and the timestamp. The intermediate KPI values data structure 310 also specifies the bucket number. In some embodiments, the workload planner 200 maintains a separate intermediate values data structure 310 for each reported KPI. In some embodiments, the intermediate KPI values data structure 310 contains entries for each reported KPI.

The intermediate KPI values data structure 310 incrementally builds/aggregates KPI data for each of the reported KPIS. In some embodiments, the intermediate KPI values data structure 310 is used to calculate a KPI numerator partial value=KPI value*Weight, and a KPI denominator partial value=Weight. As performance data samples 300 are received, the KPI numerator and KPI denominator are updated by aggregating the information from the performance data samples into previously received aggregated data for the monitoring interval. As shown in FIG. 3, in some embodiments the intermediate KPI values data is aggregated to form aggregate KPI values data structure 320 at the end of the monitoring interval. Once the end of the monitoring interval occurs, the final KPI numerator partial value and final KPI denominator partial value are copied to the aggregate KPI values data structure 320, and the intermediate KPI values data structure 310 is reset for use in connection with a subsequent monitoring interval.

In some embodiments, aggregate KPI values data structure 320 is a data structure containing a rolling six weeks of buckets of data. In some embodiments, the workload planner 200 uses two weeks of performance data for calculations, but retains six weeks for historical/debug purposes. When the workload planner 200 is to be used to determine whether a particular workload can be added to a storage system, the analysis engine uses this time series historical data for the storage system maintained in the aggregate KPI values data structure 320 to determine headroom compliance 208 and SLE compliance 206.

In some embodiments, some of the rules (discussed below) are based on average KPI values in a given bucket number over a previous two-week interval. Accordingly, as shown in FIG. 4, in some embodiments a KPI average data structure 400 is populated with average KPI values over the two-week interval. Since the same bucket number occurs at the same time each week, averaging the bucket values in this manner enables the average KPI value for the storage system to be determined for a particular four-hour window of time over the two-week evaluation period.

FIG. 5 is a functional block diagram of an example data structure 500 containing an example set of bucket values 510 for one week worth of buckets (42 buckets: columns labeled 0-41). The values contained in FIG. 5 represent port speed in mega-bits per second (mbps). Other similar data structures would contain other KPI data.

As shown in FIG. 5, in this example there is a negotiated maximum load on the port of 800 mbps (row 1). In this instance, the negotiated maximum load is constant across all buckets. The best practice limit in this example is set to 50% of the maximum load (row 2). Accordingly, as shown in FIG. 5, the best practice limit in this example is set at 400 mbps.

FIG. 5 also shows an example hypothetical amount of workload on the port over the past week based on the current amount of workload assigned to the storage system (row 4, labeled "Current Load"). FIG. 5 also shows the expected amount of workload that would have been implemented on the port over the past week if the incoming load had been implemented by the storage system (row 3, labeled "Current Load+Incoming Load).

To calculate the suitability scores for this port, in some embodiments the analysis engine 200 will look at the bucket with the current highest workload. In this example, this occurs in bucket number 38, which has a reported workload of 266. Dividing the reported workload by the best practice limit results in a suitability score of 66.5%. Once the incoming load is added to the storage system, the most impacted bucket is bucket number 1, which has an expected combined workload of 280. Dividing the expected combined workload by the best practice limit results in a suitability score of 70%. If one of the buckets for the current load plus incoming load had exceeded 400 (100% of the best practices limit) a headroom and/or SLE compliance violation would be determined by the workload planner.

In some embodiments, the workload planner 200 automates Root Cause Analysis (RCA) across multiple layers of the storage system, which is currently a manual operation. The workload planner 200 uses rules from rules engine 202 to differentiate between one-time data anomalies/spikes, consistent/lasting reductions in workload, and recurring windows of heavy workload. Although a particular set of rules will be described in connection with some embodiments, other rules or additional rules may be utilized as well.

In some embodiments, the workload planner 200 initially calculates storage group SLE compliance state of the storage system. If the storage system performance for a given key performance indicator does not exceed a respective response time threshold during any bucket of time, the workload planner determines that there is no SLE violation for that key performance indicator. FIG. 6 shows an example of a workload of this nature. In particular, FIG. 6 is a graph showing an example fluctuation of an example key performance indicator (response time) over a two-week period of time, with no instances where the storage system performance exceeded a response time threshold of 1 ms. Other KPI may have other thresholds or best practices limits, and the use of a 1 ms response time threshold is merely an example. In some embodiments, individual components have negotiated maximum performance thresholds. For example, a port may have a maximum negotiated speed of 800 mpbs. A best practices limit optionally may be set for components of this nature, for example at 50% of the maximum negotiated rate. Other best practices limits may be used as well. Other KPI, for example in connection with calculating service level expectations, may have thresholds set based on response time. Optionally, no separate best practice limit may be set for these KPI, or the best practices limit may be set to coincide with the thresholds for these KPI.

Although FIG. 6 shows a single key performance indicator (response time), the workload planner may consider multiple key performance indicators (KPIs) and calculate storage group SLE compliance for each of the key performance indicators. Likewise, the workload planner will also perform similar compliance calculations to determine whether the storage system has complied with the headroom requirements.

There are instances where the workload on the storage system will cause the workload planner to determine that the storage system state is marginal or critical, even when the storage system, in general, is operating well within the respective response time thresholds and best practices limits. According to some embodiments, the analysis engine 204 of the workload planner 200 uses one or more rules from rules engine 202 to exclude particular buckets of data in the aggregate KPI values data structure 320, and average KPI values data structure 400 that are associated with periods of high use, and then re-calculates the storage group SLE compliance and storage system headroom compliance based on a redacted time series. For example, if a storage group compliance state is calculated and the value is CRITICAL (out of compliance over the past 2 weeks AND the past 4 hours) or MARGINAL (out of compliance over the past 2 weeks OR the past 4 hours), the analysis engine 204 will use one or more of the rules from the rules engine 202 to automatically exclude one or more of the buckets 600, and then re-run the storage group SLE compliance state and headroom calculations using a redacted time series with the one or more buckets 600 excluded.

FIGS. 7-11 are graphs showing several traffic patterns that may develop on particular storage systems. These traffic patterns are discussed in greater detail below, in connection with particular rules that may be implemented by analysis engine 204 to enable the workload planner to automatically resolve headroom and SLE compliance discrepancies, according to some embodiments.

FIG. 7 is a graph showing an example fluctuation of an example key performance indicator (response time) over a two-week period of time, where the storage system performance exceeded a response time threshold for one monitoring interval at the same time each week. Specifically, FIG. 7 shows a set of buckets for a period of time from Jul. 1, 2020, to Jul. 14, 2020. In this time series, Jul. 5, 2020 is a Sunday, and Jul. 12, 2020, is also a Sunday. In this example, the storage system is configured to implement an automatic backup each Sunday morning at midnight, which corresponds to bucket 0. Accordingly, the workload shown in FIG. 7 is not compliant with the response time threshold on a periodically recurring basis, which would normally cause the workload planner 200 to determine that there was a SLE compliance discrepancy.

In some embodiments, one of the rules from the rules engine 202 is designed to exclude buckets that exceed the response time threshold or best practices limit for a particular KPI on a periodically recurring basis.

In some embodiments, if the analysis engine 204 determines that the storage system is out of compliance with the storage group SLE over the preceding two weeks, one of the rules from the rules engine 202 is that the analysis engine 204 will query the aggregate KPI values data structure 320 for buckets where the respective key performance indicator exceeded the storage group SLE response time threshold. An example KPI may be the maximum response time for the storage group. If a peak occurs in the same bucket for each of the last two weeks, the rule implemented by the analysis engine 204 causes the analysis engine to remove the buckets where the storage system was out of SLE compliance to create a redacted time series. The analysis engine then re-calculates the storage group SLE compliance based on the redacted time series, i.e. with those buckets removed. If the storage group SLE is compliant with the buckets removed, the storage system is determined to be in compliance with the SLE requirements for the storage group.

The same rules also apply to calculation of headroom compliance 208 by the analysis engine 204. Accordingly, the analysis engine will determine headroom compliance of the storage system based on the original time series historical data. If the analysis engine determines that there was 0.0 TB headroom for one or more of the storage system components during one or more buckets, the analysis engine 204 will apply the rules to create a redacted time series, and then re-compute the headroom for the particular component using the redacted time series.

Accordingly, in some embodiments, if a single periodically recurring bucket exists each week during the two-week interval, or in the same bucket in three of the last four weeks, a redacted time series is created by removing the bucket from the time series. The workload planner 200 then uses the redacted time series to calculate storage group SLE compliance 206 and headroom compliance 208. The determined compliance state is then reported.

Some storage systems usage patterns may cause the storage system to exceed particular best practice limits for longer periods of time. For example, a storage system may be configured to perform system backup/maintenance over the weekend, which can cause the storage system to be out of compliance for a set of consecutive buckets 600.

Figure 8:
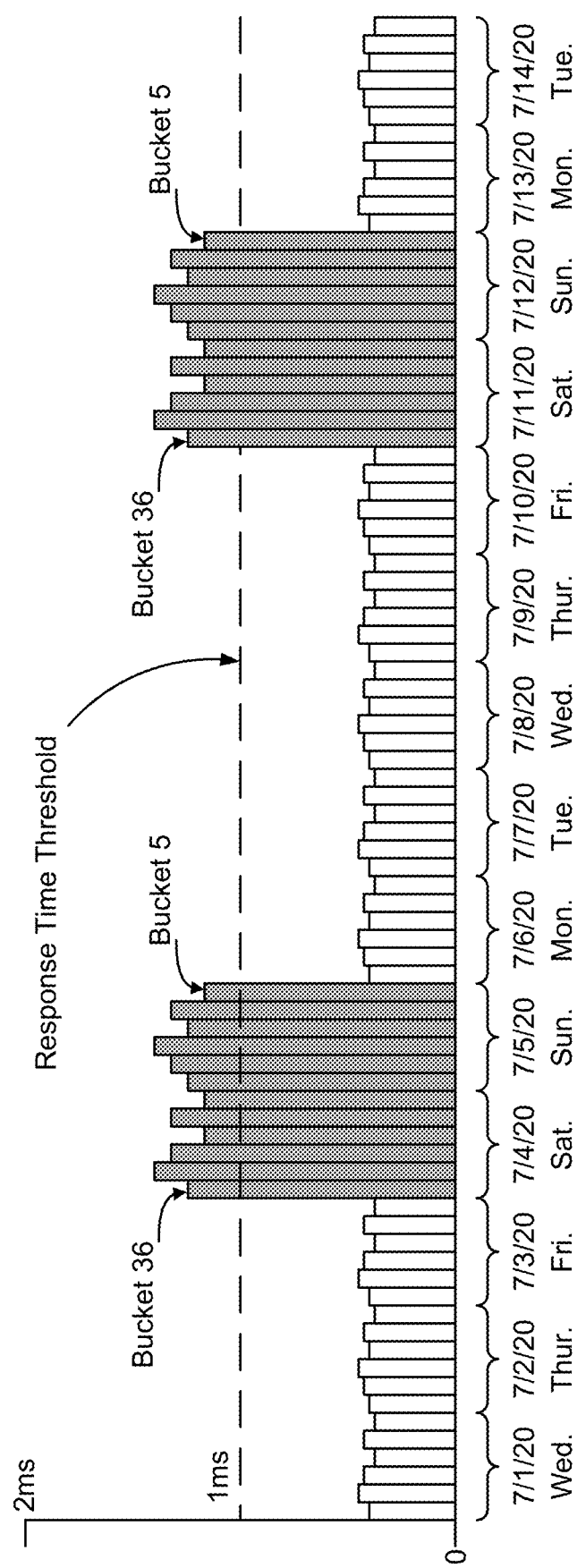
FIG. 8 is a graph showing an example fluctuation of an example key performance indicator (response time) over a two-week period of time, where the storage system performance exceeded a respective threshold for twelve consecutive monitoring intervals at the same time each week.

FIG. 8 is a graph showing an example fluctuation of an example key performance indicator (response time) over a two-week period of time, where the storage system performance exceeded a response time threshold for twelve consecutive monitoring intervals at the same time of the week, for example due to storage system backup operations occurring on the weekends.

If multiple periodically recurring buckets exist each week during the two-week interval, or in the same bucket in three of the last four weeks, in some embodiments one of the rules of rules engine 202 is that a redacted time series is created by excluding a maximum of 12 consecutive buckets from the original historical time series. This allows a maximum of two consecutive days to be excluded to cover the case when the storage system is maxed out due to, for example, backups/system maintenance on weekends. After removal of up to 12 consecutive buckets from the time series to create a redacted time series, the analysis engine 204 uses the redacted time series to re-calculate storage group SLE compliance state. The determined SLE compliance state is then reported. As noted above, the same rules apply for calculation of headroom compliance and, accordingly, the analysis engine 204 will similarly apply the same rule to create a redacted time series, if necessary, in connection with calculating headroom compliance.

Although an example rule has been illustrated in which the workload planner 200 is configured to create a redacted time series by removing up to 12 consecutive buckets, in other embodiments one of the rules from the rules engine 202 is that the workload planner 200 will only remove up to 12 consecutive buckets if those buckets fall on a weekend (buckets 36-41=Saturday, and buckets 0-5=Sunday). If the storage system is out of compliance with the best practices limit for 12 consecutive buckets during the middle of the week, those buckets should not be removed when calculating storage group SLE compliance and headroom compliance of the storage system. If the workload planner and storage system are in different time zones, in some embodiments the workload planner 200 uses the time zone of the location of the storage system when determining which buckets are eligible to be excluded.

Figure 9:
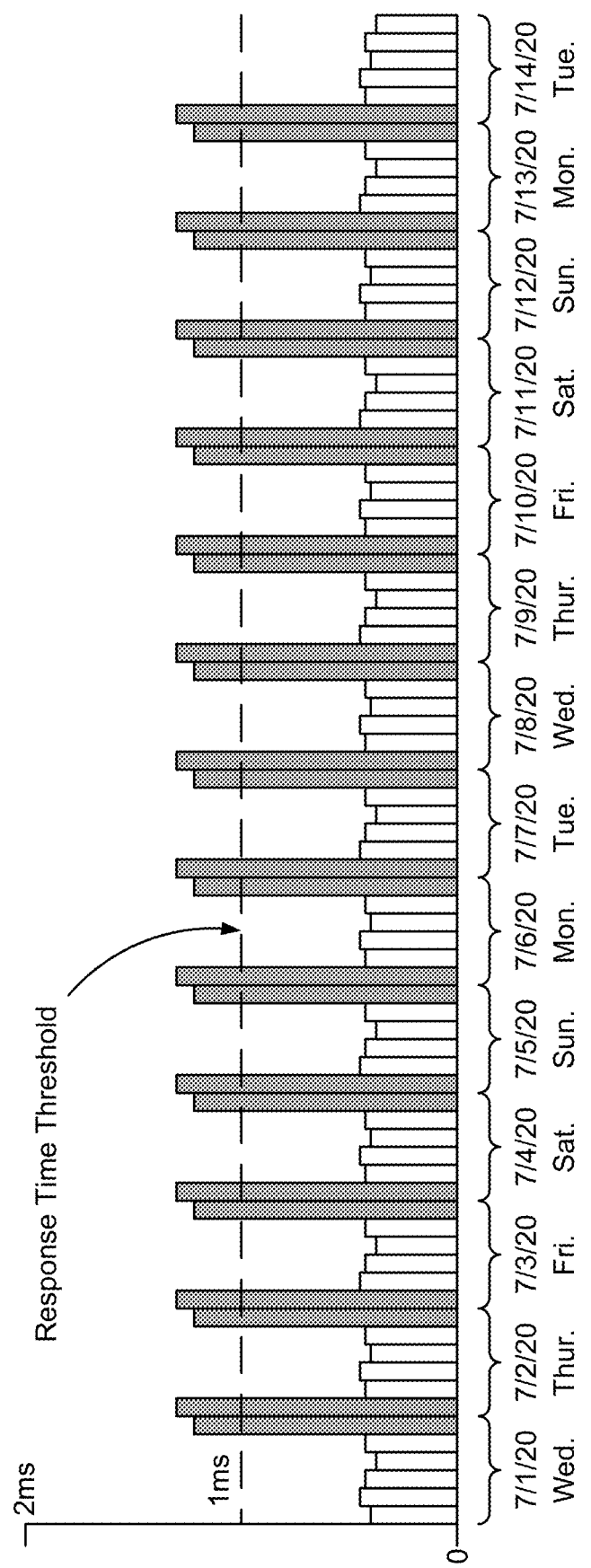
FIG. 9 is a graph showing an example fluctuation of an example key performance indicator (response time) over a two-week period of time, where the storage system performance exceeded a respective threshold for two monitoring intervals at the same time each day.

FIG. 9 is a graph showing an example fluctuation of an example key performance indicator (response time) over a two-week period of time, where the storage system performance exceeded a response time threshold for two monitoring intervals at the same time each day. A traffic pattern of this nature may be associated with a storage system that is maxed out, for example, due to backups/system maintenance during off-peak hours (e.g. at night). Optionally, only buckets associated with night-time hours may be excluded using this rule, for example by determining a time zone of the location of the storage system and only allowing the exclusion to apply to buckets associated with night-time hours of the storage system operation. This prevents buckets associated with periods of high activity in the middle of the day from being excluded when creating the redacted time series.

Accordingly, in some embodiments one of the rules from rules engine 202 is that multiple instances of 8 consecutive hours (2 consecutive buckets) may be excluded from the time series. If a traffic pattern of this nature is detected by the analysis engine in the historic time series data from the aggregated KPI values data structure 320, the analysis engine 204 will remove the consecutive buckets from the time series to create a redacted time series. The analysis engine 204 then uses the redacted time series to re-calculate storage group SLE compliance state. The determined compliance state is then reported. As noted above, the same rules apply for calculation of headroom compliance and, accordingly, the analysis engine 204 will similarly apply the same rule to create a redacted time series, if necessary, in connection with calculating headroom compliance.

Figure 10:
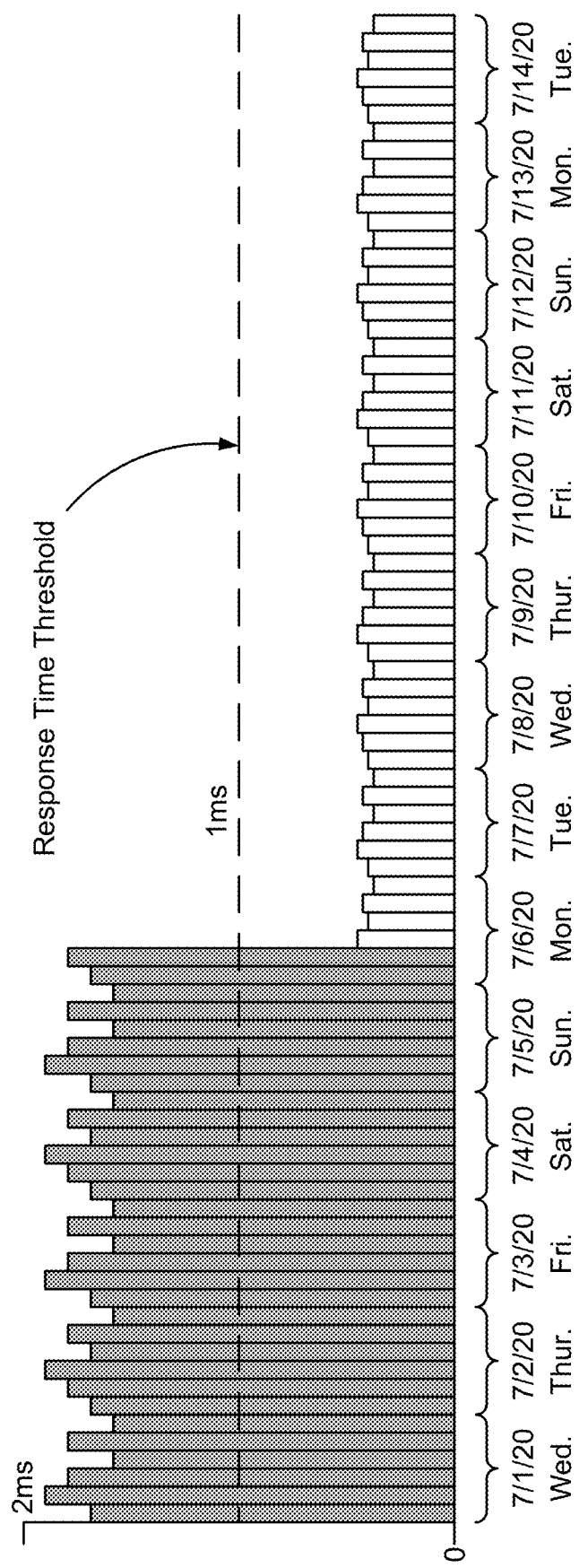
FIG. 10 is a graph showing an example fluctuation of an example key performance indicator (response time) over a two-week period of time, where the storage system performance initially exceeded a best practice limit for multiple monitoring intervals, but has not exceeded the respective threshold for several days.

FIG. 10 is a graph showing an example fluctuation of an example key performance indicator (response time) over a two-week period of time, where the storage system performance initially consistently exceeded a response time threshold for multiple monitoring intervals, but has not exceeded the response time threshold for several days.

There are instances where workload may be transferred off of a storage system. For example, if the storage system is overloaded, a portion of the workload on the storage system may be relocated to another storage system within the data center. In these situations, the storage system may initially exhibit non-compliance with the response time threshold or best practices limit for a number of monitoring intervals, and then after transfer of the workload, consistently exhibit compliance with the response time threshold or best practices limit. When the workload planner uses the time series to determine storage group SLE compliance, the workload planner will determine that the storage system is out of compliance, even though it is currently consistently operating within compliance, now that the portion of the storage system's workload has been transferred within the data center. While the buckets representing the storage system's previous workload will eventually time out, it would be preferable to be able to reset the time series to create a redacted time series that only includes buckets of key performance indicator metrics for the storage system for the period of time after the portion of the workload was transferred off of the storage system.

Figure 11:
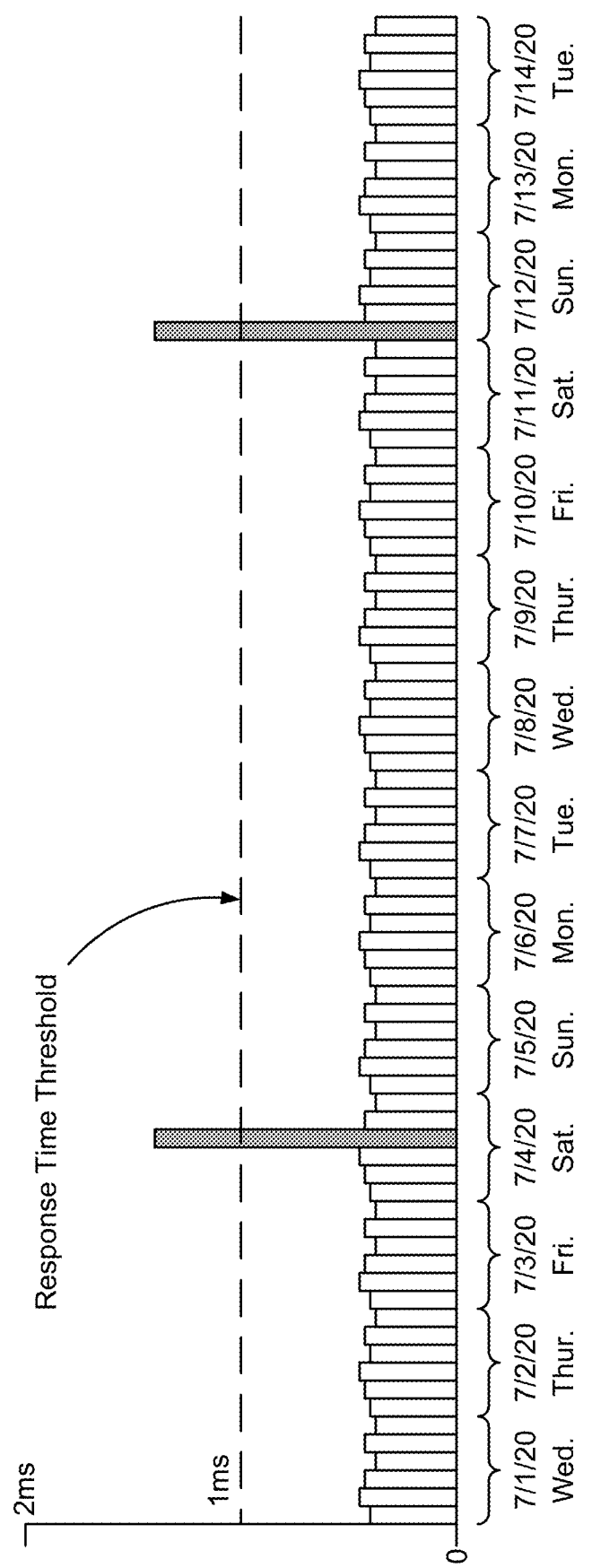
FIG. 11 is a graph showing an example fluctuation of an example key performance indicator (response time) over a two-week period of time, where the storage system performance exceeded a respective threshold for two unrelated monitoring intervals during the past two weeks.

According to some embodiments, one rule of the rules engine 202 is that the analysis engine should query the aggregate KPI values data structure 320 for buckets where the KPI exceeded the response time threshold or best practices level by at least 50% and occur more than 48 hours previous. If more than two data points are returned, the analysis engine 204 will set the most recent offending timestamp as the new workload planner start time and exclude all previous datapoints. The analysis engine thus creates a redacted time series, and re-calculates SLE compliance based on the redacted time series. As noted above, the same rules apply for calculation of headroom compliance and, accordingly, the analysis engine 204 will similarly apply the same rule to create a redacted time series, if necessary, in connection with calculating headroom compliance. There are also instances where a given storage system may exhibit individual instances of non-compliance that are not periodic, while overall remaining substantially compliant with the response time threshold or best practices limits. For example, FIG. 11 is a graph showing an example fluctuation of an example key performance indicator (response time) over a two-week period of time, where the storage system performance exceeded a response time threshold for two unrelated monitoring intervals during the past two weeks.

According to some embodiments, one of the rules of the rules engine 202 is that the analysis engine 204 should query the aggregate KPI values data structure 320 for four-hour response time buckets that exceeded the response time threshold or best practices limit and occur more than 48 hours previous. If two or fewer data points are returned, the analysis engine 204 will create a redacted time series with those buckets excluded, and re-calculate storage group SLE compliance state. The determined compliance state is then reported. As noted above, the same rules apply for calculation of headroom compliance and, accordingly, the analysis engine 204 will similarly apply the same rule to create a redacted time series, if necessary, in connection with calculating headroom compliance.

If none of the rules is applicable, the SLE compliance state for the storage group in question is reported as initially calculated (marginal or critical), without any exclusions. Likewise, for headroom, if none of the rules applies, the headroom will be reported as 0 TB, as determined by the workload planner.

In some embodiments, the workload planner 200 implements this analysis for each KPI (Key Performance Indicator), when determining SLE compliance and headroom compliance. Because Service Level Expectations are set at the storage group level, the workload planner 200 implements this analysis for each KPI on each storage group. Example storage group KPI metrics may include:
  IO Rate
  Response Time
  Random Read Hit Rate Per Second
  Sequential Read Per Second
  Read Miss Per Second
  Random Write Per Second
  Sequential Write Per Second
  Write Hit Per Second
  Copy IOs Per Second
  Copy IO (Megabytes Per Second)
  Data Mirroring Writes Per Second (Synchronous and Asynchronous)
  Average IO Size (KB)
  Average Write Size
  Average Read Size
  Number of Allocated Tracks
  Device Block Size Storage group KPI metrics may also be collected on a per storage tier basis. Example storage group KPI metrics (per storage tier), may include:
  Allocated Tracks
  Back End Reads
  Back End Writes
  Back End MB Read Rate
  Back End MB Write Rate
  Prefetched Tracks Per Second
  Prefetched MB Per Second In some embodiments, the workload planner computes headroom using a set of algorithms that looks at the back end array component utilization, and runs a FAST (Fully Automated Storage Tiering) simulation to ensure storage groups (including the new incoming workload) will meet their service level response time and thin pools will meet their SLE response times. For headroom, the workload planner compares utilization against a set of best practice limits, instead of response time thresholds for storage group service level expectation compliance. Additionally, headroom is computed at the array level, considering all components of the array, while the storage group SLE compliance is implemented at the storage group level for each storage group.

Example KPI metrics for storage system components may include:
  Front End Port (MB Per Second)
  Back End Port (MB Per Second)
  Remote Data Forwarding Port (MB Per Second)
  Front End Director IO Rate Per Second
  Back End Director IO Rate Per Second
  Remote Data Forwarding (RDF) Director IO Rate Per Second
  RDF Group Sampled Average RDF Write Time
  RDF Group Total Number of Writes If the headroom for more than one storage resource pool/emulation/service combination is zero, the workload planner looks for peaks in back end component utilizations. Back end components, in this context, include back end ports, back end directors, thin pools, system cache, etc. The workload planner compares utilization of these components to a best practice threshold for each component.

If peaks in these components have occurred over the past two weeks, the same rules discussed above in connection with FIGS. 6-11 are used to remove one or more of the buckets. The redacted time series, with one or more of the buckets removed, is then used to determine headroom for the storage system.

If a suitable data exclusion is detected, based on the data layout, the redacted time series will be created and the FAST simulation will be re-run on the redacted time series. If the new headroom is non-zero, the workload planner will provide the results. If not, the workload planner will report the available headroom as 0.0 TB. If no data exclusions are available, the headroom for the array, storage resource pool, emulation, service level combination in question is reported as 0.0 TB without exclusions.

Figure 12:
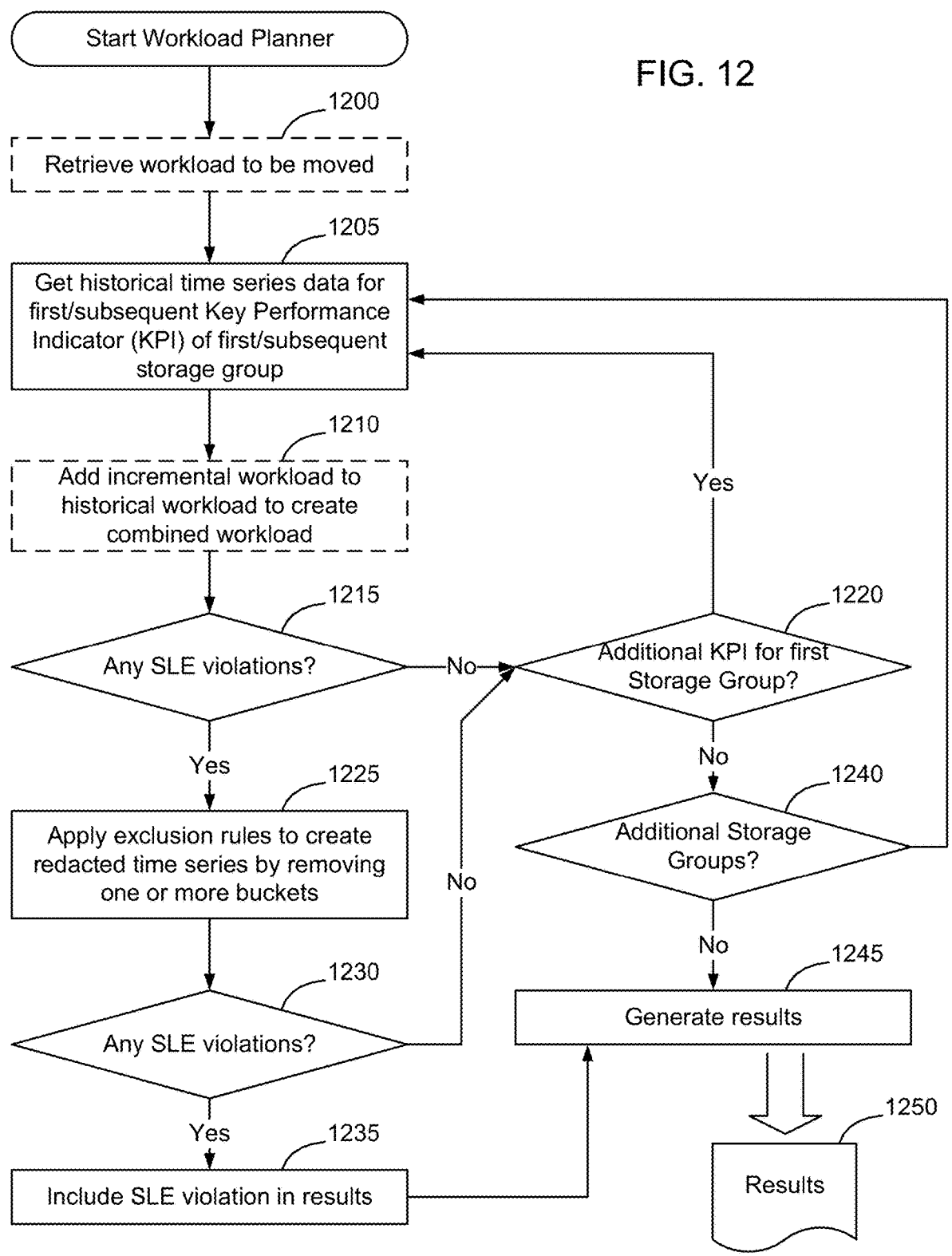
FIG. 12 is a flow chart of an example method of automatically resolving service level expectation compliance discrepancies, according to some embodiments.
Figure 13:
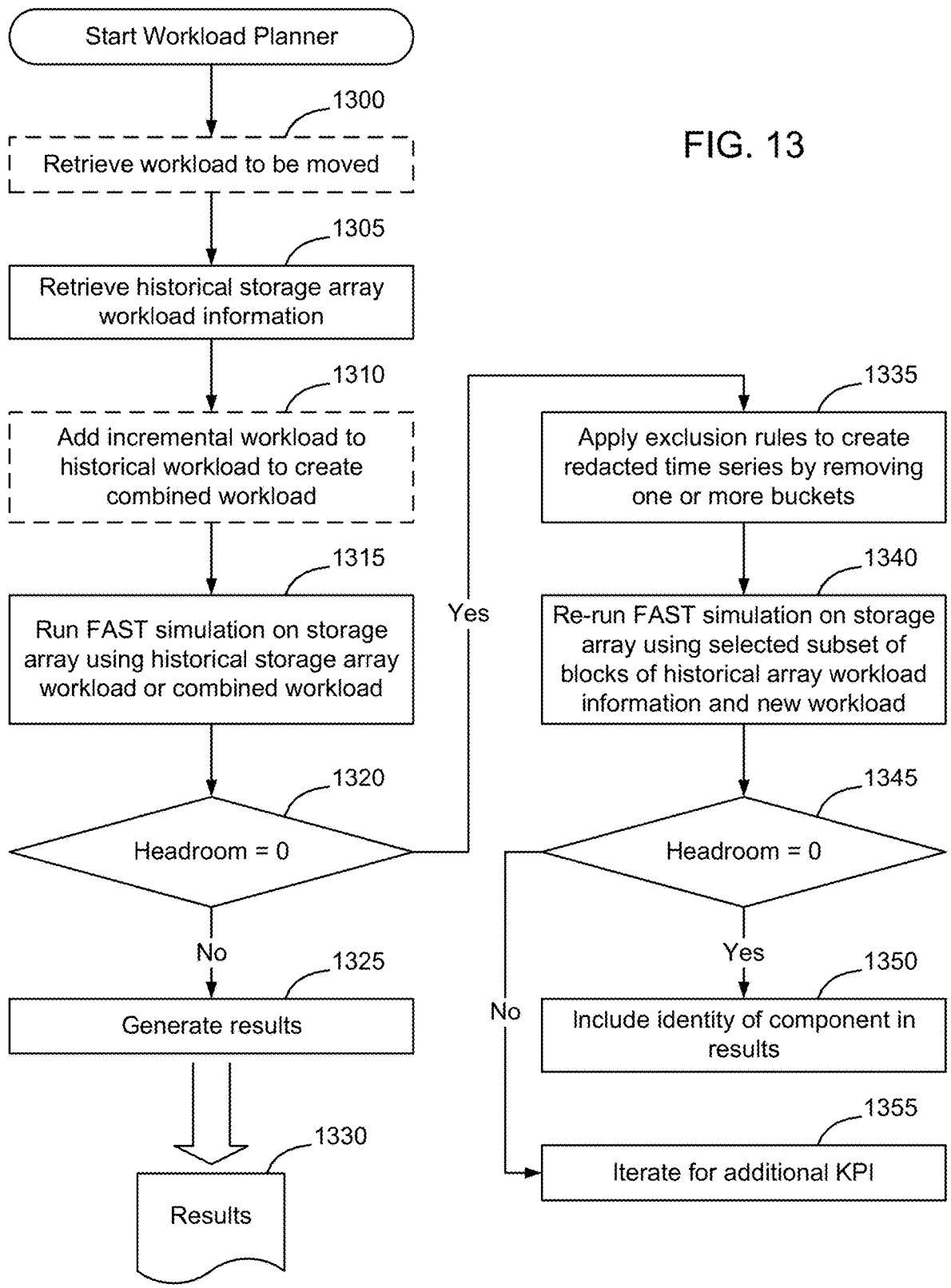
FIG. 13 is a flow chart of an example method of automatically resolving headroom compliance discrepancies, according to some embodiments.

FIGS. 12 and 13 are flow charts of example methods of automatically resolving service level expectation and headroom compliance discrepancies. The workload planner may implement resolution of compliance discrepancies based on the original (historical) workload on the storage system. Alternatively, the workload planner may implement resolution of compliance discrepancies based on a combined workload, which is a combination of both the original (historical) workload on the storage system and a new workload that is to be added to the storage system. Likewise, the workload planner may consider only the historical workload in connection with calculating SLE compliance and may consider the combined workload in connection with calculating headroom compliance (or vice versa) depending on the embodiment. Accordingly, in FIGS. 12 and 13, the portions of the flow diagram associated with creating a combined workload have been drawn using dashed lines to indicate that these steps are optional, depending on the particular manner in which the workload planner is being used.

FIG. 12 is a flow chart of an example method of automatically resolving service level expectation compliance discrepancies, according to some embodiments. As shown in FIG. 12, in some embodiments the workload planner is started and, if the workload planner is to implement SLE compliance based on a combined workload, the workload planner retrieves the workload to be moved (block 1200). There are many ways of characterizing the workload that is to be moved, depending on the implementation. Where the workload planner is to implement SLE compliance based on the original (historical) workload only, without consideration of any additional workload, the process skips over block 1200.

The workload planner gets historical time series data for the first key performance indicator of a first storage group (block 1205). In the context of determining compliance of the storage group with a service level expectation, in some embodiments the key performance indicator is the response time exhibited by the storage group over the preceding two weeks. The response time may be based on the amount of time the storage group took to implement a read IO operation, a write IO operation, or the total response time which is based on a blend of both read IO and write IO operations.

If the SLE compliance is to be based on a combined workload, the retrieved workload to be moved is then added to the historical time series data to create a combined time series workload (block 1210). Where the workload planner is to implement SLE compliance based on the original (historical) workload only, without consideration of the workload that is to be moved, the process skips over block 1210.

Using the historical or combined time series data, the workload planner then determines whether there were any SLE (Service Level Expectation) violations over the preceding two-week period of time (block 1215). If there were no SLE violations (a determination of NO at block 1215), the process continues to block 1220, where a determination is made as to whether there are other KPI (Key Performance Indicators) that should be considered for the storage group. For example, if the workload planner initially considers SLE compliance of the storage group based on read IO operations, the workload planner may subsequently consider SLE compliance of the storage group based on write IO operations. Accordingly, a determination is made as to whether there are additional KPIs for the storage group (block 1220). If the workload planner needs to consider additional KPIs for the storage group (a determination of YES at block 1220), the process returns to block 1205 where the historical information associated with performance of the storage group relative to the new KPI is obtained (block 1205), and checked for SLE violations (block 1215). If there are no additional KPIs to be considered (a determination of NO at block 1220) the process iterates for each additional storage group (block 1240). Once there are no additional storage groups (a determination of NO at block 1240) the workload planner generates the results (block 1245) which are output 1250.

Any time the workload planner determines that one of the storage groups has violated a SLE for a respective KPI (a determination of YES at block 1215), the workload planner looks through the time series of the historical data for the KPI that is retrieved in block 1205, and applies one or more exclusion rules from rules engine 202 to create a redacted time series by removing selected buckets of historical KPI data and not using the data of those removed buckets when determining SLE violations (block 1225). In some embodiments, the rules discussed above in connection with FIGS. 6-11 are applied at block 1225 to create a redacted time series. The redacted time series is then used by the workload planner to check for SLE violations at block 1230. If no SLE violation is detected based on the redacted time series (a determination of NO at block 1230), the storage group is determined to not fail SLE for that KPI and the process continues to block 1220 to process additional KPIs for the storage group and to process additional storage groups.

If a SLE violation is determined based on the redacted time series (a determination of YES at block 1230), the SLE violation is included in the results (block 1235). In some embodiments, the reported SLE value determined in block 1215 (based on the original time series) is included in the results (block 1235). In some embodiments, the reported SLE value determined in block 1230 (based on the redacted time series) is also included in the results (block 1235).

In some embodiments, the process continues to look for SLE violations for all storage groups based on all KPI, regardless of a determination of a SLE violation in block 1230. In other embodiments, once a SLE violation is determined in block 1230, the process ends.

By applying one or more exclusion rules to create a redacted time series, in block 1225, and then re-running the SLE compliance algorithms using the redacted time series, it is possible to automatically resolve multiple SLE compliance discrepancies. For example, rather than determining that a storage system has a marginal or critical status based on increased traffic during storage backup periods, the workload planner is able to automatically exclude the buckets associated with these types of events. This enables a more accurate assessment of the actual capacity of the storage system. By cycling through all of the KPI and all of the storage groups, the workload planner 200 automates Root Cause Analysis (RCA) across multiple layers of the storage system. The workload planner 200 uses rules from rules engine 202 to differentiate between one-time data anomalies/spikes, consistent/lasting reductions in workload, and recurring windows of heavy workload, to automatically resolve headroom and service level compliance discrepancies.

FIG. 13 is a flow chart of an example method of automatically resolving headroom discrepancies, according to some embodiments. As shown in FIG. 13, the process of computing headroom for a storage system is similar to the process of computing SLE compliance, except that the headroom determination is performed at the storage system component level rather than at the storage group level.

Accordingly, when the workload planner is started, if the workload planner is to implement headroom compliance based on a combined workload, the workload planner will retrieve the workload that is to be moved (block 1300). The workload planner also retrieves the historic time series storage array workload information (block 1305). If the headroom compliance is to be based on a combined workload, the retrieved workload to be moved is then added to the historical time series data to create a combined time series workload (block 1310). Where the workload planner is to implement headroom compliance based on the original (historical) workload only, without consideration of the workload that is to be moved, the process skips over blocks 1300 and 1310.

The workload planner will then run a FAST simulation on the storage array, using the historic or combined time series workload (block 1315). This enables the workload planner to determine how the storage system would have performed over the preceding two-week period with the new workload added to the storage systems existing workload. The FAST simulation, in some embodiments, allocates workloads to storage tiers within the storage system, and analyzes the combined workload on the components of the storage system.

A determination is then made, at block 1320, if the headroom for any of the storage system components dropped to 0 TB at any point in time during the preceding two-week period. The comparison, in block 1320, is based on the best practices limit for each component. If adding the new workload to the storage system would not have caused any of the components of the storage system to reach the best practices limit (a determination of NO at block 1320), the workload planner generates results (block 1325) which are output 1330.

If the headroom value for any component of the storage system drops to 0 (a determination of YES at block 1320), the workload planner looks through the time series of the historical data that is retrieved in block 1305, and applies one or more exclusion rules from rules engine 202 to create a redacted time series, by removing one or more buckets of historical data from the combined time series (block 1335). In some embodiments, the rules discussed above in connection with FIGS. 6-11 are applied at block 1335 to create a redacted time series. The redacted time series is then used by the workload planner to check for headroom violations at blocks 1340 and 1345. In some embodiments, the workload planner re-runs the FAST simulation on the storage array (block 1340) using the selected subset of buckets of historical array workload information in the redacted time series, along with the new workload.

If no headroom violation is detected based on the redacted time series (a determination of NO at block 1345), the storage system is determined to not have a headroom violation. The results of the headroom calculation are then generated (block 1325) and output (block 1330). The process of blocks 1335, 1340, and 1345 iterates for each component that was determined in block 1315 to have headroom=0 TB (block 1355).

If the headroom for one or more of the components is determined to be zero based on the redacted time series (a determination of YES at block 1345), moving the new workload to the storage system would cause at least some of the components of the storage system to exceed the best practices limit such that the headroom for that component would be 0 TB. Accordingly, in some embodiments the identity of the component is indicated in the results (block 1350).

By applying one or more exclusion rules to create a redacted time series, in block 1335, re-running the FAST simulation using the redacted time series (block 1340), and using the redacted time-series to determine headroom compliance (block 1345), it is possible to automatically resolve multiple headroom compliance discrepancies. For example, rather than determining that a storage system has a marginal or critical status based on increased traffic during storage backup periods, the workload planner is able to automatically exclude the buckets associated with these types of events. This enables a more accurate assessment of the available headroom of the storage system during normal operating conditions.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for automatically resolving SLE (Service Level Expectation) compliance discrepancies, the computer program including a set of instructions which, when executed by a computer, cause the computer to perform a method comprising the steps of:

retrieve a time series historical workload for the storage system, the time series historical workload having buckets of data where each bucket of data represents operation of a particular KPI (Key Performance Indicator) of the storage system over a respective monitoring interval; and determining SLE (Service Level Expectation) compliance of the storage system based on the time series historical workload;

if the selected storage group fails SLE compliance:

determining one or more buckets where the storage group failed SLE compliance;

applying one or more exclusion rules to remove one or more of the buckets where the storage group failed SLE compliance to create a redacted time series workload; and determining storage group SLE compliance for the selected storage group based on the redacted time series workload.

2. The non-transitory tangible computer readable storage medium of claim 1, further comprising:

retrieving a new workload that is to be added to a storage system; and creating a combined time series workload by adding the new workload to the time series historical workload for each of the respective buckets;

wherein the step of determining SLE compliance of the storage system is based on the combined time series workload.

3. The non-transitory tangible computer readable storage medium of claim 1, wherein one of the exclusion rules is that if the storage system operation exceeds a response time threshold in a respective bucket each week, the respective bucket is removed from the time series historical workload to create the redacted time series workload.

4. The non-transitory tangible computer readable storage medium of claim 1, wherein one of the exclusion rules is that if the storage system operation exceeds a response time threshold in up to twelve consecutive respective buckets each week, the up to twelve consecutive respective buckets are removed from the time series historical workload to create the redacted time series workload.

5. The non-transitory tangible computer readable storage medium of claim 1, wherein one of the exclusion rules is that if the storage system operation exceeds a response time threshold in up to two consecutive respective buckets each day, the up to two consecutive respective buckets each day are removed from the time series historical workload to create the redacted time series workload.

6. The non-transitory tangible computer readable storage medium of claim 1, wherein one of the exclusion rules is that if the storage system operation exceeds a response time threshold by more than 50% for a set of consecutive buckets, but has not exceeded the response time threshold for at least two days, the time series historical workload is reset to begin at the most recent bucket where the storage system response time did not exceed the response time threshold to create the redacted time series workload.

7. The non-transitory tangible computer readable storage medium of claim 1, wherein one of the exclusion rules is that if the storage system operation exceeds a response time threshold in up to two unrelated buckets in the preceding two weeks, the up to two unrelated buckets are removed from the time series historical workload to create the redacted time series workload.

8. The non-transitory tangible computer readable storage medium of claim 1, further comprising outputting the determined SLE compliance for the selected storage group.

9. The non-transitory tangible computer readable storage medium of claim 1, further comprising iterating the step of determining SLE compliance of the storage system based on the time series historical workload for multiple storage group and multiple key performance indicators.

10. A non-transitory tangible computer readable storage medium having stored thereon a computer program for automatically resolving headroom compliance discrepancies, the computer program including a set of instructions which, when executed by a computer, cause the computer to perform a method comprising the steps of:

retrieve a time series historical workload for the storage system, the time series historical workload having buckets of data where each bucket of data represents operation of a particular KPI (Key Performance Indicator) of the storage system over a respective monitoring interval; and determining headroom compliance of the storage system based on the time series historical workload;

if the headroom of a given component of the storage system is determined to 0.0 TB:

determining one or more buckets where the headroom of the given component of the storage system was determined to be 0 TB;

applying one or more exclusion rules to remove one or more of the buckets where the headroom of the given component was determined to be 0 TB to create a redacted time series workload; and determining headroom compliance of the storage system based on the redacted time series workload.

11. The non-transitory tangible computer readable storage medium of claim 10, further comprising:

retrieving a new workload that is to be added to a storage system; and creating a combined time series workload by adding the new workload to the time series historical workload for each of the respective buckets;

wherein the step of determining headroom compliance of the storage system is based on the combined time series workload.

12. The non-transitory tangible computer readable storage medium of claim 10, wherein one of the exclusion rules is that if the storage system operation exceeds a best practice limit in a respective bucket each week, the respective bucket is removed from the time series historical workload to create the redacted time series workload.

13. The non-transitory tangible computer readable storage medium of claim 10, wherein one of the exclusion rules is that if the storage system operation exceeds a best practice limit in up to twelve consecutive respective buckets each week, the up to twelve consecutive respective buckets are removed from the time series historical workload to create the redacted time series workload.

14. The non-transitory tangible computer readable storage medium of claim 10, wherein one of the exclusion rules is that if the storage system operation exceeds a best practice limit in up to two consecutive respective buckets each day, the up to two consecutive respective buckets each day are removed from the time series historical workload to create the redacted time series workload.

15. The non-transitory tangible computer readable storage medium of claim 10, wherein one of the exclusion rules is that if the storage system operation exceeds a best practice limit by more than 50% for a set of consecutive buckets, but has not exceeded the best practice limit for at least two days, the time series historical workload is reset to begin at the most recent bucket where the storage system response time did not exceed the best practice limit to create the redacted time series workload.

16. The non-transitory tangible computer readable storage medium of claim 10, wherein one of the exclusion rules is that if the storage system operation exceeds a best practice limit in up to two unrelated buckets in the preceding two weeks, the up to two unrelated buckets are removed from the time series historical workload to create the redacted time series workload.

17. The non-transitory tangible computer readable storage medium of claim 10, further comprising outputting the determined headroom compliance for the selected storage group.

18. The non-transitory tangible computer readable storage medium of claim 10, further comprising iterating the step of determining headroom compliance of the storage system based on the time series historical workload for multiple storage system components and multiple key performance indicators.

* * * * *